United States Patent
Landau-Holdsworth et al.

(10) Patent No.: US 9,751,417 B2
(45) Date of Patent: *Sep. 5, 2017

(54) METHOD, SYSTEM, AND APPARATUS FOR DISTRIBUTING ELECTRICITY TO ELECTRIC VEHICLES, MONITORING THE DISTRIBUTION THEREOF, AND/OR PROVIDING AUTOMATED BILLING

(75) Inventors: Mario Landau-Holdsworth, San Francisco, CA (US); Amber Case, Portland, OR (US); Adan Vielma, Portland, OR (US)

(73) Assignee: Evercharge, Inc., San Francisco, CA (US)

( * ) Notice: Subject to any disclaimer, the term of this patent is extended or adjusted under 35 U.S.C. 154(b) by 1157 days.

This patent is subject to a terminal disclaimer.

(21) Appl. No.: 12/683,938

(22) Filed: Jan. 7, 2010

(65) Prior Publication Data

US 2010/0241560 A1 Sep. 23, 2010

Related U.S. Application Data

(60) Provisional application No. 61/161,358, filed on Mar. 18, 2009.

(51) Int. Cl.
*G06Q 40/00* (2012.01)
*B60L 11/18* (2006.01)
(Continued)

(52) U.S. Cl.
CPC ......... *B60L 11/1824* (2013.01); *B60L 3/0069* (2013.01); *B60L 8/003* (2013.01);
(Continued)

(58) Field of Classification Search
USPC .............................................. 705/35, 39, 40
See application file for complete search history.

(56) References Cited

U.S. PATENT DOCUMENTS 4,532,418 A 7/1985 Meese et al.
5,184,058 A 2/1993 Hesse et al.
(Continued)

FOREIGN PATENT DOCUMENTS

GB 2438979 A 12/2007
JP 2006074868 * 3/2006 .............. B60L 11/18
(Continued)

OTHER PUBLICATIONS

The Cost of Generating Electricity , Mar. 2004, The Royal Academy of Engineering, pp. 7-13.*
(Continued)

*Primary Examiner* — Hani M Kazimi
*Assistant Examiner* — Kellie Campbell
(74) *Attorney, Agent, or Firm* — Renaissance IP Law Group, LLP; David A. Crowther (57) ABSTRACT

An electricity distribution, monitoring, and control system for recharging electric vehicles. The system may include a plug outlet device having a sensor, and a plug adapter apparatus having a tag. The tag may communicate with the sensor when the plug adapter apparatus is coupled to the plug outlet device. An electric vehicle receives an electric charge from the plug outlet device after an identification number associated with the tag is verified by a remote server. Alternatively, a plug outlet device includes a tag, and an electric vehicle has attached thereto a monitoring and communication device, which may include a sensor. The sensor may communicate with the tag when the electric vehicle is proximally located to the plug outlet device, and obtain authorization from a remote server or the outlet device to charge the electric vehicle. A user account is automatically billed and a provider account is automatically credited.

8 Claims, 7 Drawing Sheets

(51) Int. Cl.
*B60L 3/00* (2006.01)
*B60L 8/00* (2006.01)
*G06Q 20/10* (2012.01)

(52) U.S. Cl.
CPC ......... *B60L 11/184* (2013.01); *B60L 11/1844* (2013.01); *B60L 11/1846* (2013.01); *G06Q 20/10* (2013.01); *B60L 2230/16* (2013.01); *B60L 2240/70* (2013.01); *Y02E 60/721* (2013.01); *Y02T 10/7005* (2013.01); *Y02T 10/7083* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 5,272,431 | A | 12/1993 | Nee |
| 5,323,099 | A | 6/1994 | Bruni et al. |
| 5,327,066 | A | 7/1994 | Smith |
| 5,349,535 | A | 9/1994 | Gupta |
| 5,369,352 | A | 11/1994 | Toepfer et al. |
| 5,422,624 | A | 6/1995 | Smith |
| 5,461,298 | A | 10/1995 | Lara et al. |
| 5,461,299 | A | 10/1995 | Bruni |
| 5,467,006 | A * | 11/1995 | Sims ................................. 237/5 |
| 5,499,181 | A | 3/1996 | Smith |
| 5,548,200 | A | 8/1996 | Nor et al. |
| 5,563,491 | A | 10/1996 | Tseng |
| 5,594,318 | A | 1/1997 | Nor et al. |
| 5,684,379 | A | 11/1997 | Svedoff |
| 5,717,374 | A | 2/1998 | Smith |
| 5,742,229 | A | 4/1998 | Smith |
| 5,790,976 | A | 8/1998 | Boll et al. |
| 5,806,018 | A | 9/1998 | Smith et al. |
| 5,847,537 | A | 12/1998 | Parmley, Sr. |
| 5,914,654 | A | 6/1999 | Smith |
| 5,926,004 | A | 7/1999 | Henze |
| 5,927,938 | A | 7/1999 | Hammerslag |
| 6,018,293 | A | 1/2000 | Smith |
| 6,067,008 | A | 5/2000 | Smith |
| 6,185,501 | B1 | 2/2001 | Smith et al. |
| 6,307,347 | B1 | 10/2001 | Ronning |
| 6,463,967 | B1 | 10/2002 | Boyle |
| 6,614,204 | B2 | 9/2003 | Pellegrino et al. |
| 6,727,809 | B1 | 4/2004 | Smith |
| 6,771,188 | B2 | 8/2004 | Flick |
| 6,850,898 | B1 | 2/2005 | Murakami et al. |
| 6,859,009 | B2 | 2/2005 | Jablin |
| 6,864,807 | B2 | 3/2005 | Todoriki et al. |
| 7,058,524 | B2 | 6/2006 | Hayes et al. |
| 7,068,991 | B2 | 6/2006 | Parise |
| 7,298,289 | B1 | 11/2007 | Hoffberg |
| 7,358,851 | B2 | 4/2008 | Patenaude et al. |
| 7,373,247 | B2 | 5/2008 | Park |
| 7,602,274 | B2 | 10/2009 | Lee et al. |
| 7,616,105 | B2 | 11/2009 | Macielinski et al. |
| 7,737,829 | B2 | 6/2010 | Nishiyama |
| 7,994,908 | B2 | 8/2011 | Tonegawa et al. |
| 7,999,665 | B2 | 8/2011 | Chander et al. |
| 8,000,074 | B2 | 8/2011 | Jones et al. |
| 8,054,048 | B2 | 11/2011 | Woody et al. |
| 8,093,861 | B2 | 1/2012 | Christensen |
| 2002/0070881 | A1 | 6/2002 | Marcarelli et al. |
| 2002/0158749 | A1 | 10/2002 | Ikeda et al. |
| 2003/0120442 | A1 | 6/2003 | Pellegrino et al. |
| 2003/0209375 | A1 | 11/2003 | Suzuki et al. |
| 2004/0104814 | A1 | 6/2004 | Christensen et al. |
| 2005/0052286 | A1 | 3/2005 | Perraud et al. |
| 2005/0143955 | A1 | 6/2005 | Quint et al. |
| 2007/0126395 | A1 | 6/2007 | Suchar |
| 2007/0278998 | A1 | 12/2007 | Koyama |
| 2008/0039989 | A1 | 2/2008 | Pollack et al. |
| 2008/0208401 | A1 | 8/2008 | Kumar et al. |
| 2009/0021213 | A1 | 1/2009 | Johnson |
| 2009/0030712 | A1 | 1/2009 | Bogolea et al. |
| 2009/0062967 | A1 | 3/2009 | Kressner et al. |
| 2009/0066287 | A1 * | 3/2009 | Pollack et al. ................. 320/101 |
| 2009/0079388 | A1 | 3/2009 | Reddy |
| 2009/0082957 | A1 | 3/2009 | Agassi et al. |
| 2009/0091291 | A1 | 4/2009 | Woody et al. |
| 2009/0184833 | A1 | 7/2009 | Tonegawa et al. |
| 2009/0192927 | A1 | 7/2009 | Berg et al. |
| 2009/0195349 | A1 * | 8/2009 | Frader-Thompson et al. .............................. 340/3.1 |
| 2009/0210357 | A1 | 8/2009 | Pudar et al. |
| 2009/0237239 | A1 | 9/2009 | McSheffrey |
| 2009/0251300 | A1 | 10/2009 | Yasuda et al. |
| 2009/0261779 | A1 | 10/2009 | Zyren |
| 2009/0313103 | A1 * | 12/2009 | Ambrosio et al. ......... 705/14.25 |
| 2010/0049737 | A1 | 2/2010 | Ambrosio et al. |
| 2010/0060452 | A1 | 3/2010 | Schuster et al. |
| 2010/0065627 | A1 * | 3/2010 | Outwater ...................... 235/381 |
| 2010/0153193 | A1 | 6/2010 | Ashby et al. |
| 2010/0161480 | A1 * | 6/2010 | Littrell ........................... 705/40 |
| 2010/0161481 | A1 | 6/2010 | Littrell |
| 2010/0174667 | A1 | 7/2010 | Vitale et al. |
| 2010/0211340 | A1 | 8/2010 | Lowenthal et al. |
| 2010/0211643 | A1 | 8/2010 | Lowenthal et al. |
| 2010/0225475 | A1 | 9/2010 | Karch et al. |
| 2010/0241542 | A1 | 9/2010 | Pinkusevich et al. |
| 2010/0274570 | A1 | 10/2010 | Proefke et al. |
| 2010/0315197 | A1 | 12/2010 | Solomon et al. |
| 2011/0282535 | A1 | 11/2011 | Woody et al. |

FOREIGN PATENT DOCUMENTS

| | | | | |
|---|---|---|---|---|
| JP | 2006074868 A1 | 3/2006 | | |
| JP | 2008083022 A * | 4/2008 | ............. | B60L 11/14 |
| JP | 2008083022 A1 | 4/2008 | | |
| JP | 2008295136 A * | 12/2008 | ............. | B60L 11/18 |
| JP | 2008295136 A1 | 12/2008 | | |

OTHER PUBLICATIONS

International Search Report/Written Opinion, PCT/US2010/027651, Oct. 21, 2010, ISA/KR, Korean Intellectual Property Office, Daejeon, Republic of Korea.
Wang, Yunyan, "Management Information System of Charging Station for Electric Vehicle (EV)," Proceedings of the Eighth International Conference on Electrical Machines and Systems, 2005 ICEMS, vol. 1, Sep. 27-29, 2005, pp. 857-860.
Pratt, Robert G., et al., "Development of a Microprocessor-based, Credit Card Operated, Electric Vehicle Parking/Charging Meter System," Electric Vehicle Council, EVC Expo '83, Oct. 4-6, 1983, pp. 1-9, Detroit, Michigan.
Abella, M. Alonso, et al., "Photovoltaic Charging Station for Electric Vehicles," 2003, Proceedings of 3rd World Conference on Photovoltaic Energy Conversion, May 12-16, 2003, vol. 3, pp. 2280-2283, Osaka,Japan.
C'Connell, Lawrence G., "Infrastructure Considerations for Electric Vehicles," Electric Power Research Institute, No. 921539, Aug. 1992, pp. 1-5.
Coulomb Technologies, "Changing the Way We Get Places," http://www.coulombtech.com/library/chargepoint_appnote.php, Dec. 16, 2009.
Pudar, U.S. Appl. No. 61/44,009, Provisional Application Specification, p. 5—Par. 18.
U.S. Appl. No. 61/144,009, filed Jan. 12, 2009, Nikola Pudar.
U.S. Appl. No. 61/210,306, filed Mar. 17, 2009, Igor Pinkusevich.
The Cost of Generating Electricity, Mar. 2004, The Royal Academy of Engineering, pp. 7-13.
U.S. Appl. No. 61/144,009, filed Jan. 12, 2009.
U.S. Appl. No. 61/210,306, filed Mar. 17, 2009.

(56) References Cited

OTHER PUBLICATIONS

IBM, Green Car Versatile Plug, Dec. 18, 2008, IPCOM000177564D.

* cited by examiner

METHOD, SYSTEM, AND APPARATUS FOR DISTRIBUTING ELECTRICITY TO ELECTRIC VEHICLES, MONITORING THE DISTRIBUTION THEREOF, AND/OR PROVIDING AUTOMATED BILLING

RELATED APPLICATION DATA

This application claims the benefit of U.S. provisional patent application Ser. No. 61/161,358, filed Mar. 18, 2009, herein incorporated by reference.

FIELD OF THE INVENTION

This application pertains to electricity distribution, and more particularly, to a method, system, and apparatus for distributing electricity to electric vehicles, monitoring the distribution thereof, and providing automated billing.

BACKGROUND

Pure electric vehicles and plug-in hybrid electric vehicles are beginning to take hold in the marketplace. The price of energy for operating an electric vehicle is much lower than that of running a conventional gasoline vehicle. For example, in today's prices, to drive an electric vehicle 30 miles costs around $0.60 compared with around $2.00-$3.00 for a gasoline vehicle. However, one of the challenges with electric vehicle transportation is the ability for electric vehicle users to conveniently recharge their vehicles at remote locations, while providing adequate compensation to both real estate owners and electricity producers. Although electric vehicles are four to five times more efficient than gasoline cars, they suffer from a lack of infrastructure that effectively limits how far they can travel.

Increasing the number of locations for vehicles to recharge quickly could mean lower costs by reducing battery payloads, and would broaden the range of travel. Nevertheless, conventional efforts to accelerate the installation and adoption of charging locations have been elusive and ineffective. Difficulties persist, particularly in the areas of providing secure monitoring and control of the electricity distribution to the electric vehicles. Moreover, challenges remain for providing automated tracking and billing. These are only a few of the challenges presented by conventional approaches, which are impeding the wider adoption of electric vehicle technologies, and ultimately hurting efforts for energy independence and environmental responsibility.

Accordingly, a need remains for a method, system, and apparatus for distributing electricity to electric vehicles, monitoring the distribution thereof, and for providing automated billing.

The foregoing and other features of the invention will become more readily apparent from the following detailed description, which proceeds with reference to the accompanying drawings.

DETAILED DESCRIPTION OF THE EMBODIMENTS

To solve the problems in the prior art, an embodiment of the invention begins by setting forth a device for use by station owners to provide access to convenient electrical recharging for electric vehicle users, and a simple way for the electric vehicle users to pay for the electrical recharging. While often referred to herein as "electric vehicles," such vehicles can include plug-in hybrid vehicles, pure electric vehicles, or any one of a variety of vehicles that operate or move using at least some electricity.

Some embodiments of the invention provide an apparatus, system, and method of billing to automatically and securely bill for electricity or energy usage by users of devices such as electric vehicles. In one embodiment, a plug outlet device may be situated in a recharging location accessible by electric vehicles. For example, a provider such as a real estate owner, electricity or energy producer, or station owner may provide the plug outlet device and/or the electricity for recharging the electric vehicles. For the sake of simplicity, these will hereinafter be referred to merely as a "provider," although such reference can mean one entity, or more than one entity, involved in providing the plug outlet device and/or the electricity. The provider may locate the plug outlet device in the recharging location and ensure that an energy source is electrically coupled to the plug outlet device. The plug outlet device may include, for example, a microcontroller, a radio frequency identification (RFID) sensor, an infrared sensor, a contactor, a current sensor, or a communication device, among other components, any or all of which may be surrounded by an enclosure.

An electric vehicle user may plug the vehicle into the plug outlet device and begin verification of his or her account status by exposing, or otherwise operatively coupling, an RFID tag to the RFID sensor. The RFID tag may have associated therewith a user's identification (ID). The RFID tag may be embedded in a plug adapter apparatus, which may be operatively coupled to the plug outlet device. The RFID tag may be structured to communicate with the RFID sensor only when the terminal end of the plug adapter apparatus is inserted into the plug outlet device.

The user's ID and location information of the plug outlet device, among other information, may be transmitted to a remote computer server, which may then verify any of the information including the user's ID and the location information. Once verified, the remote server may transmit a signal back to the plug outlet device at the recharging location, which may trigger a contactor within the plug outlet device to release the flow of electricity to the vehicle. When the user unplugs the plug adapter apparatus from the plug outlet device, a message may be transmitted to the remote server detailing the amount of electricity or energy consumed for the charging of the electric vehicle. The remote server may access its database to determine the price of electricity or energy associated with the particular location of the plug outlet device, and may access the database to determine the provider's surcharge. The surcharge may be associated with a particular station or plug outlet device, among other possibilities. The remote server may automatically bill or deduct from the user's account for the electricity or energy used and the surcharge. The remote server may credit the account or accounts of the provider for the cost of the electricity and/or the surcharge. As previously mentioned, the provider may be any one or more of the station owner, real estate owner, or electricity producer, among other possibilities.

In one example embodiment, the described system can lower transaction costs by avoiding credit card transaction fees. Furthermore, the electric vehicle user can access a map of stations that participate in a common vehicle-charging network, which improves knowledge about the network and encourages increased usage of the network by electric vehicles users and station owners; electric vehicle charging at each participating station is accessible using the electric vehicle user's ID. In addition, the provider can earn a return on the investment of installing the plug outlet device, and other components, thereby supplying an incentive to the provider to participate. In another example embodiment, the plug outlet device can recognize any vehicle user ID on the network, which also increases the likelihood that electric vehicle users will connect to the system, and can reassure and incentivize the provider to continue offering electric vehicle charging services. These and other embodiments will now be described in detail with reference to the following figures.

Figure 1:
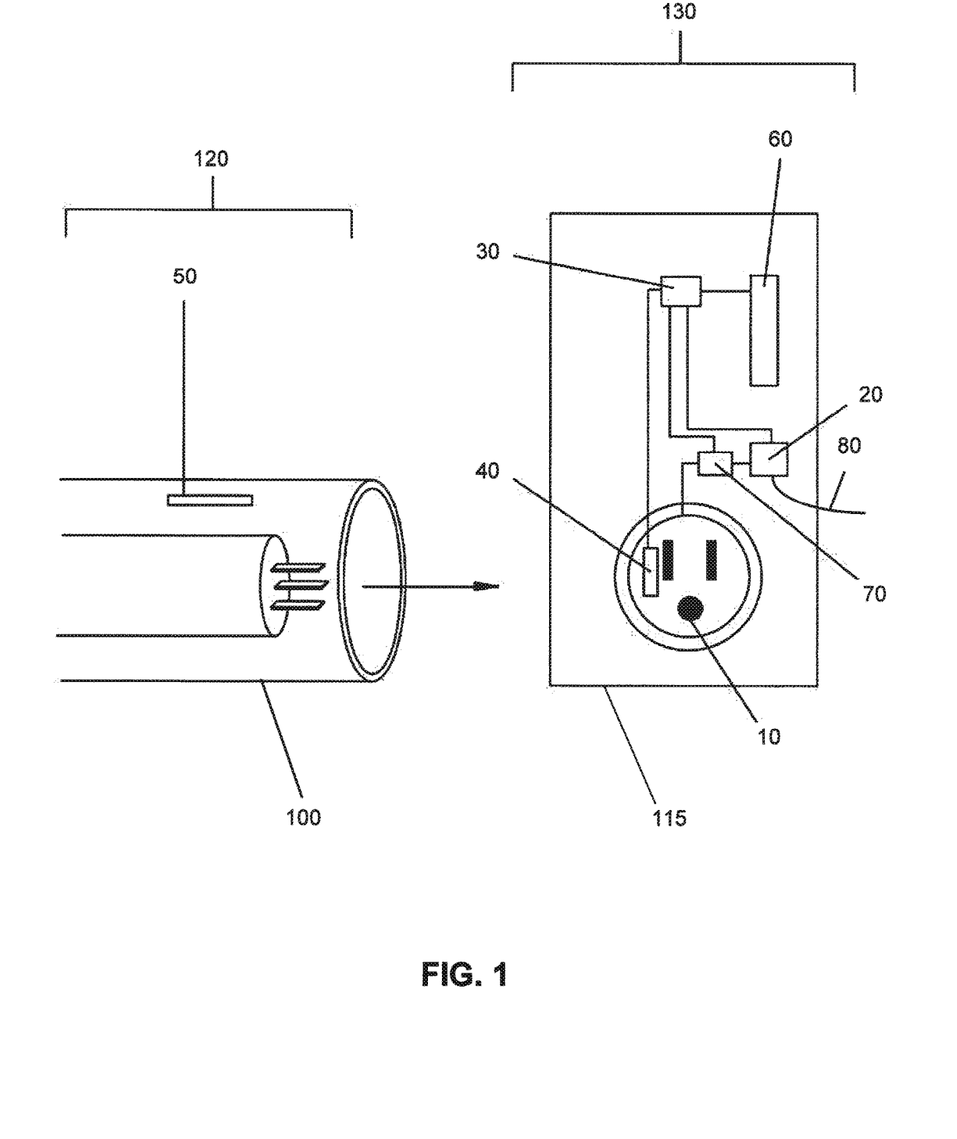
FIG. 1 illustrates a schematic diagram including a plug adapter apparatus and a plug outlet device according to a first example embodiment.

FIG. 1 illustrates a schematic diagram including a plug adapter apparatus 120 and a plug outlet device 130 according to a first example embodiment. The plug adapter apparatus 120 may include a radio frequency identification (RFID) tag 50 enclosed by an electromagnetic shield 100, so that the RFID tag 50 can only be read when the plug adapter apparatus 120 is inserted into, or otherwise operatively coupled to, the plug outlet device 130.

The plug outlet device 130 may include an RFID sensor 40, which may be located beneath a shielded portion of the plug adapter apparatus 120 when the plug adapter apparatus 120 is plugged in to the plug outlet 10, so that the RFID sensor 40 can identify the RFID tag 50. The RFID sensor 40 may be structured to read information from the RFID tag 50. The plug outlet device 130 may also include a microcontroller 30, a communication device 60, a contactor 70, a voltage or current sensor 20, and a connection to a high voltage source 80. Any or all of the components of the plug outlet device 130 may be contained within the enclosure 115.

As previously mentioned, the provider may locate the plug outlet device 130 at the recharging location and ensure that an energy source, such as the high voltage source 80, is electrically coupled to the plug outlet device 130. An electric vehicle user may plug the plug adapter apparatus 120 into the plug outlet device 130 and begin verification of his or her account status by exposing, or otherwise operatively coupling, the RFID tag 50 to the RFID sensor 40. The RFID tag 50 may have associated therewith a user's identification (ID). The RFID tag 50 may be embedded in the plug adapter apparatus 120, which may be operatively coupled to the plug outlet device 130. The RFID tag 50 may be structured to communicate with the RFID sensor 40 only when the terminal end of the plug adapter apparatus 120 is inserted into the plug outlet device 130.

Figure 2:
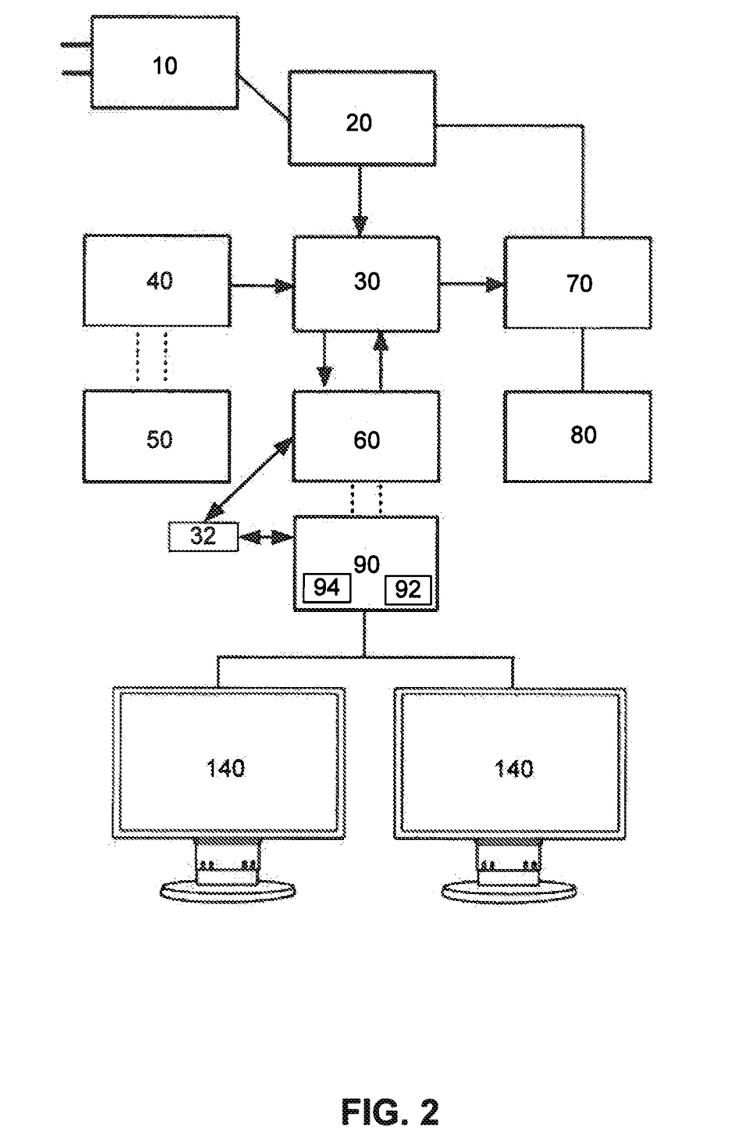
FIG. 2 illustrates a flow diagram including a process to monitor, control, and distribute electricity to one or more electric vehicles according to the first embodiment.

FIG. 2 illustrates a flow diagram including a process to monitor, control, and distribute electricity to one or more electric vehicles according to the first embodiment. Referring now to FIGS. 1 and 2, the microcontroller 30 may continuously or periodically check the status of the RFID sensor 40. The RFID sensor 40 may detect a user ID number from the RFID tag 50 and transmit the user ID number to the microcontroller 30. It should be understood that the "user ID" can correspond to an identifier of a user of the vehicle, or an identifier of the vehicle itself. The microcontroller 30 may transmit the user ID number to a communication device 60, which may transmit the user ID number to the remote computer server 90.

The communication device 60 may provide a wireless or wired connection from the microcontroller 30 to an intermediary wireless device 32, such as a cell phone. One example of the wireless connection includes a Bluetooth® or other short-distance wireless connection technology operatively coupling the microcontroller 30 to the intermediary wireless device 32. The intermediary wireless device 32 may communicate with a wireless network such as a cellular network so that a communication link can be established between the remote server 90 and the microcontroller 30. The microcontroller 30 can automatically adjust to different varieties of communication devices, whether Bluetooth®, wired, cellular, satellite, WI-FI®, etc. In addition, the intermediary wireless device 32 can maintain a log of each transaction or communication to be stored on the intermediary wireless device 32 for future reference.

The remote server 90 may be located either on the general premises where the plug outlet device 130 is located—however, the remote server 90 is preferably located at a remote location different from where the plug outlet device 130 is located. In addition, location information of the plug outlet device 130, such as a location ID number, may also be transmitted, among other information, from the microcontroller 30 to the communication device 60, and then to the remote server 90. The remote server 90 may verify the status of the user ID number and the location information, and may transmit a verification signal to the microcontroller 30.

When the microcontroller 30 receives the verification signal, it may switch the contactor 70 to electrically couple the high voltage source 80 to the plug outlet 10. As soon as the high voltage is electrically coupled to the plug outlet 10, the microcontroller 30 begins monitoring energy usage by taking measurements using a voltage or current sensor 20. The microcontroller 30 transmits the measurements from the voltage or current sensor 20 to the remote server 90. When the user or vehicle finishes receiving electricity, the user unplugs the plug adapter apparatus 120 from the plug outlet 10 of the plug outlet device 130. This interruption may be detected by the voltage or current sensor 20 and/or the RFID sensor 40, each of which are operatively coupled to the microcontroller 30.

The microcontroller 30 may transmit a message to the remote server 90 indicating that the user or vehicle is finished receiving electricity or energy, and detailing the amount of electricity or energy consumed for the charging of the electric vehicle. The remote server 90 may access the database 92 to determine the price of electricity or energy associated with the particular location of the plug outlet device 130, or based on a source of energy, and may access the database 92 to determine the provider's surcharge. The surcharge may be associated with a particular station or plug outlet device, among other possibilities. The remote server 90 may also store a record of the electricity or energy usage and may automatically bill or deduct from the user's account or accounts 94 according to the price and surcharge stored in the database 92 of the remote server 90. Prices of electricity stored in the database 92 can vary based on the location of the plug outlet device 130, and therefore, the database 92 can store a variety of different prices for different locations. In other words, the price of electricity can be determined based on the location of the plug outlet devices. The remote server 90 may credit the account or accounts 94 of the provider by an amount corresponding to the cost of the electricity or energy and/or the surcharge. At about this time, the microcontroller 30 returns to monitoring the RFID sensor 40. While the database 92 and the user/provider account(s) 94 are shown as separate, it should be understood that the database 92 may include the user/provider account(s) 94.

The remote server 90 may also host one or more web pages 140, which can be accessed by one or more computers 140. The one or more web pages 140 can be used to modify the software on the microcontroller 30 and on the remote server 90 to automate the distribution of the electricity, change billing criteria, change ownership of an account, or check the status of the microcontroller 30 or other components of the system, among other possibilities. For example, the server 90 may transmit signals to the microcontroller 30 at regular intervals to check that it is operational. If not, the remote server 90 may alert an administrator via email, text messages, or by some other alert means.

Figure 3:
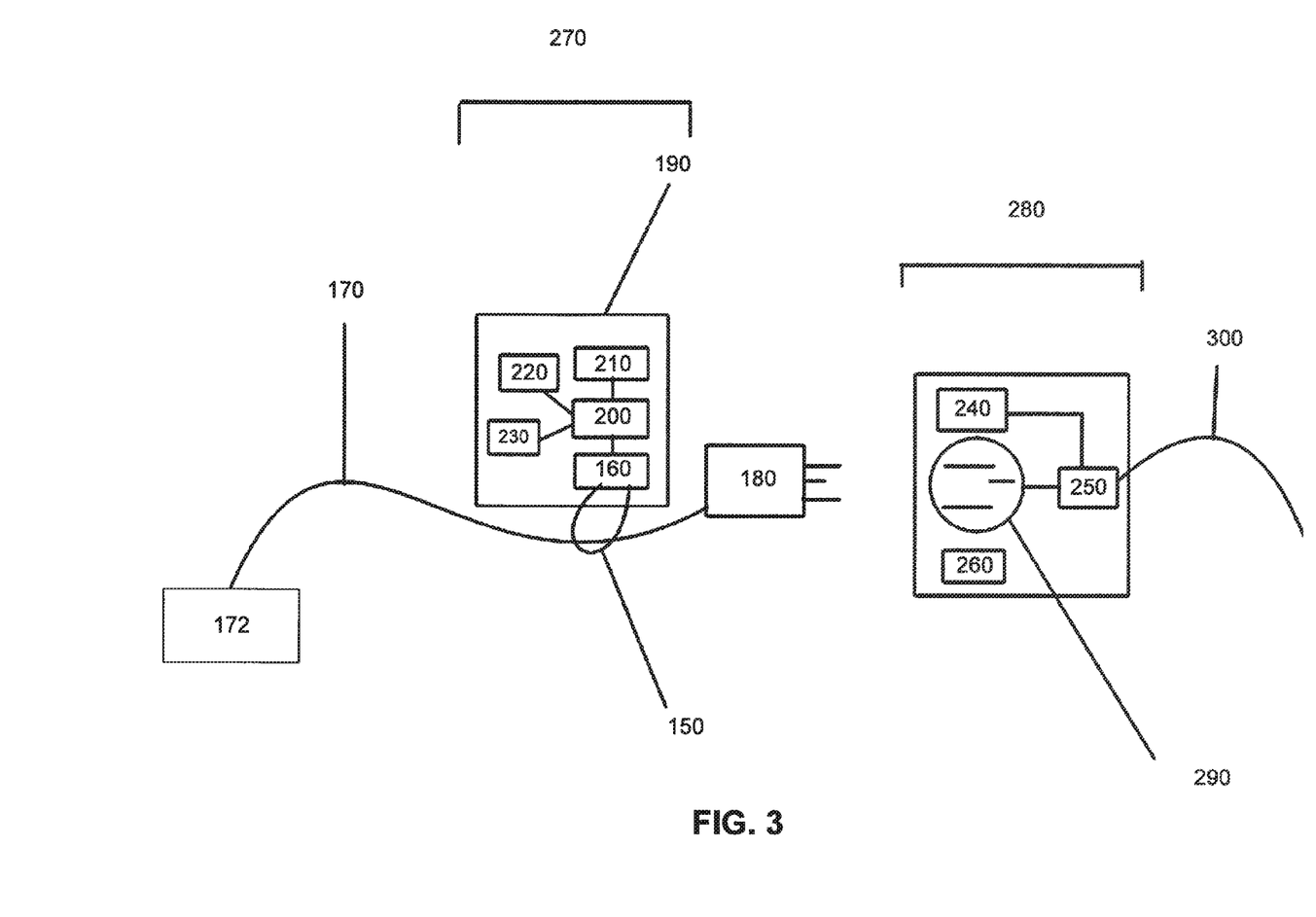
FIG. 3 illustrates a schematic diagram including a monitoring and communication device, and a plug outlet device, according to a second example embodiment.

FIG. 3 illustrates a schematic diagram including a monitoring and communication device 270, and a plug outlet device 280, according to a second example embodiment. The monitoring and communication device 270 may be located in or about the electric vehicle 172, and may include a conductive loop 150, such as a wire loop, situated around a cord 170, without being directly wired into the high power circuit associated with the cord 170. Although the term "cord" is frequently used herein, such term can include any type of conductor, and/or may include a protective element around the conductor. One end of the cord 170 may be electrically coupled to the electric vehicle 172 and another end of the cord 170 may be electrically coupled to the plug end 180.

The monitoring and communication device 270 may include an enclosure 190 containing a microcontroller 200, a voltage or current sensor 160, an RFID sensor 210, a communication device 220, and/or an authentication key 230. The voltage or current sensor 160 may measure the charge across the conductive loop 150. The voltage or current sensor 160 may transmit the measured charge to the microcontroller 200. The microcontroller 200 may be operatively coupled to the communication device 220, the authentication key 230, and the RFID sensor 210. The monitoring and communication device 270 may be operatively associated with the cord 170 via the conductive loop 150.

The plug outlet device 280 may include an authentication device 240, an RFID tag 260, a contactor 250, and a plug outlet 290. The plug outlet device 280 may be electrically coupled to a high voltage source 300, but is normally off until the plug end 180 is inserted, detected, and validated. The authentication device 240 may be operatively coupled to the contactor 250. The contactor 250 may switch on the flow of electricity from the high voltage source over line 300 to the plug outlet 290. The RFID tag 260 may be read from outside of the enclosure of the plug outlet device 280.

Figure 4:
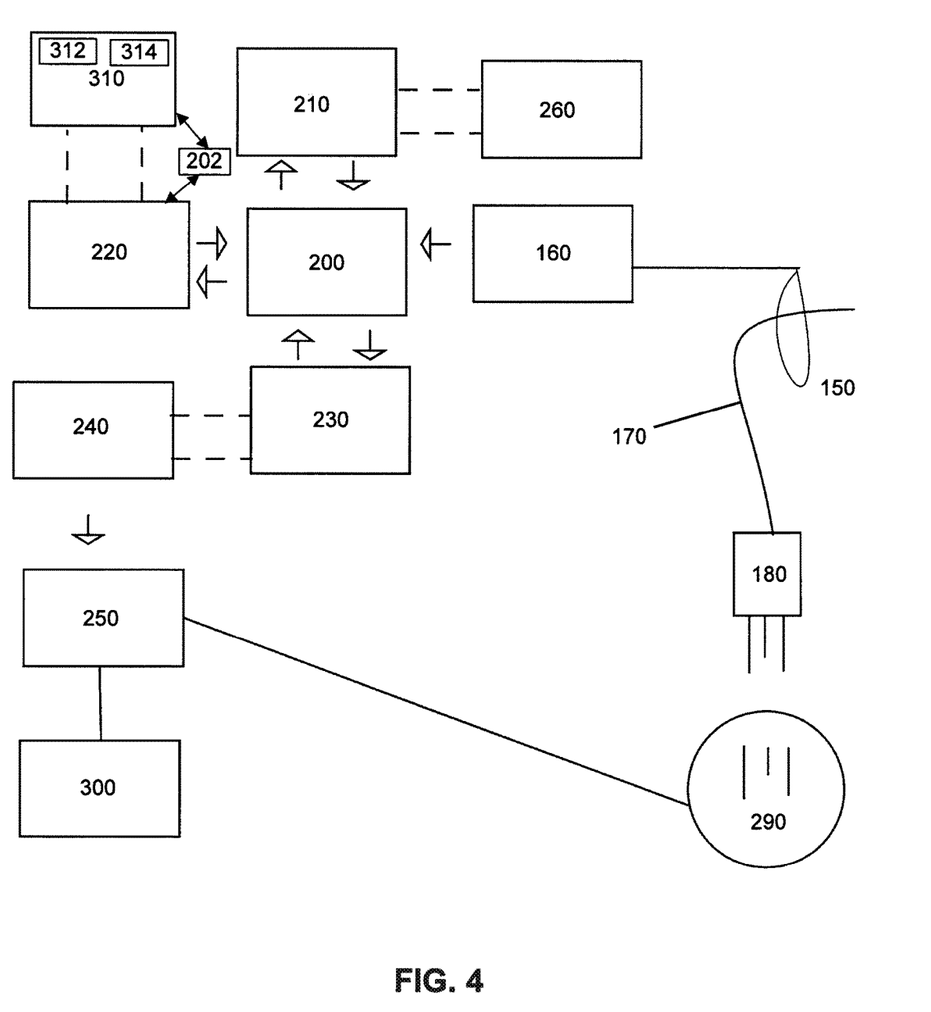
FIG. 4 illustrates a flow diagram including a process to monitor, control, and distribute electricity to one or more electric vehicles according to the second embodiment.

FIG. 4 illustrates a flow diagram including a process to monitor, control, and distribute electricity to one or more electric vehicles according to the second embodiment. Referring now to FIGS. 3 and 4, the microcontroller 200 of the monitoring and communication device 270 may continuously or periodically check the RFID sensor 210 for the presence of any RFID tags, such as RFID tag 260 of the plug outlet device 280. If the RFID sensor 210 detects a station ID number stored on an RFID tag, such as RFID tag 260 of the plug outlet device 280, then the station ID number is transmitted to the communication device 220, which wirelessly transmits the station ID number to a remote computer server 310. The station ID number, among other information such as a microcontroller ID, may be wirelessly transmitted over a cell phone network, a satellite network, or a WI-FI® network, among other possibilities, from the communication and monitoring device 270 to the remote server 310.

For example, the communication device 220 may provide a Bluetooth® or other wireless or wired connection from the microcontroller 200 to an intermediary wireless device 202, such as a cell phone. The intermediary wireless device 202 may communicate with a wireless network such as a cellular network so that a communication link can be established between the remote server 310 and the microcontroller 200. The microcontroller 200 can automatically adjust to different varieties of communication devices, whether Bluetooth®, wired, cellular, satellite, WI-FI®, etc. In addition, the intermediary wireless device 202 can maintain a log of each transaction or communication to be stored on the intermediary wireless device for future reference.

The remote server 310 may verify that the station ID number is a valid plug-in location and that the microcontroller ID is associated with a valid user account. The remote server 310 may wirelessly transmit a verification message to the microcontroller 200 of the monitoring and communication device 270. When the server verification is received by the microcontroller 200, the microcontroller 200 may transmit the authentication key 230 of the monitoring and control device 270 to the authentication device 240 of the plug outlet device 280 over either a wireless or wired connection. After authentication, the contactor 250 may be switched to supply electricity from the high voltage source 300 to the plug outlet 290. The microcontroller 200 may monitor the voltage or current sensor 160, which monitors the charge on the conductive loop 150 and may transmit this information to the remote server 310. The amount of electricity or energy used can be determined based on the charge information gathered from the conductive loop 150. When the user unplugs the plug end 180 from the plug outlet device 280, this action is detected by the voltage or current sensor 160.

The microcontroller 200 may wirelessly transmit a message to the remote server 310 indicating that the user or vehicle is finished receiving electricity or energy, and detailing the amount of electricity or energy consumed for the charging of the electric vehicle, or the charge information measured by the voltage or current sensor 160. The remote server 310 may access the database 312 to determine the price of electricity or energy associated with the particular location of the plug outlet device 280, or based on a source of energy, and may access the database 312 to determine the provider's surcharge. Prices of electricity stored in the database 312 can vary based on the location of the plug outlet device 280, and therefore, the database 312 can store a variety of different prices for different locations. In other words, the price of electricity can be determined based on the location of the plug outlet devices. The remote server 310 may also store a record of the electricity or energy usage and may automatically bill or deduct from the user's account or accounts 314 according to the price and surcharge stored in the database 312 of the remote server 310. The remote server 310 may credit the account or accounts 314 of the provider by an amount corresponding to the cost of the electricity or energy and/or the surcharge. At about this time, the microcontroller 200 returns to monitoring the RFID sensor 210. It should be understood that while the database 312 and the user/provider account(s) 314 are shown as separate, the database 312 can include the user/provider account(s) 314.

The microcontroller 200 may include a security feature to prevent tampering with the monitoring and communication device 270. Specifically, whenever the microcontroller 200 detects a break in the conductive loop 150 after initial placement of the conductive loop 150 around the cord 170, the microcontroller 200 would prevent authentication until reset by an authorized administrator. For example, the microcontroller 200 may prevent the authentication key 230 from being provided to the authentication device 240 when a break is detected in the conductive loop 150, unless otherwise overridden by the administrator.

Figure 5:
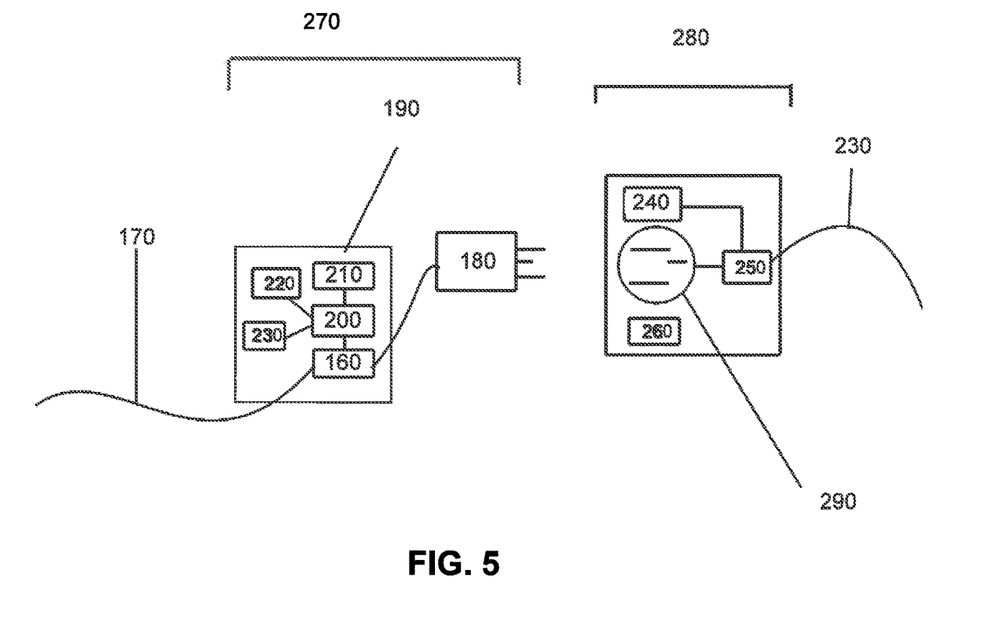
FIG. 5 illustrates a schematic diagram including a monitoring and communication device, and a plug outlet device, according to a third example embodiment.
Figure 6:
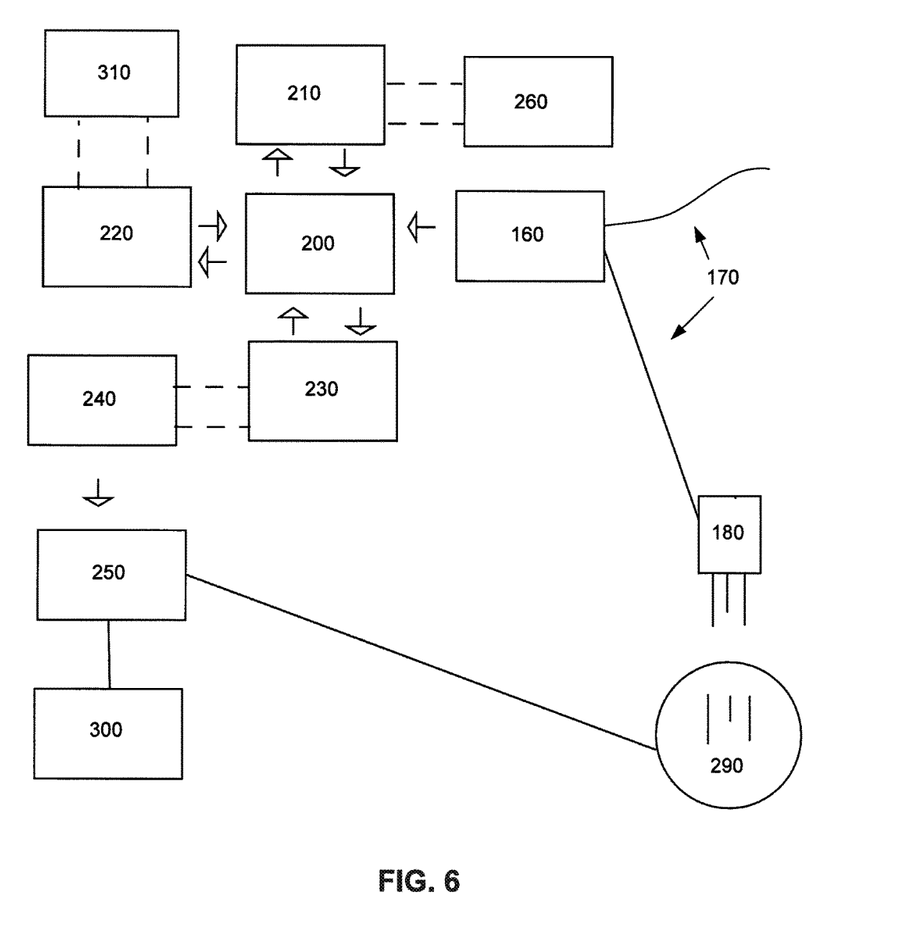
FIG. 6 illustrates a flow diagram including a process to monitor, control, and distribute electricity to one or more electric vehicles according to the third embodiment.

FIG. 5 illustrates a schematic diagram including a monitoring and communication device 270, and a plug outlet device 280, according to a third example embodiment. FIG. 6 illustrates a flow diagram including a process to monitor, control, and distribute electricity to one or more electric vehicles according to the third embodiment.

The third example embodiment associated with FIGS. 5 and 6 operates in substantially the same way as in the second embodiment shown with reference to FIGS. 3 and 4, except that rather than monitoring the charge associated with the conductive loop, a voltage or current sensor 160 measures the voltage, or current flow, in cord 170. Otherwise, the remaining elements function substantially in the same fashion as described above. Therefore, for the sake of brevity, a detailed description will be herein omitted.

Figure 7:
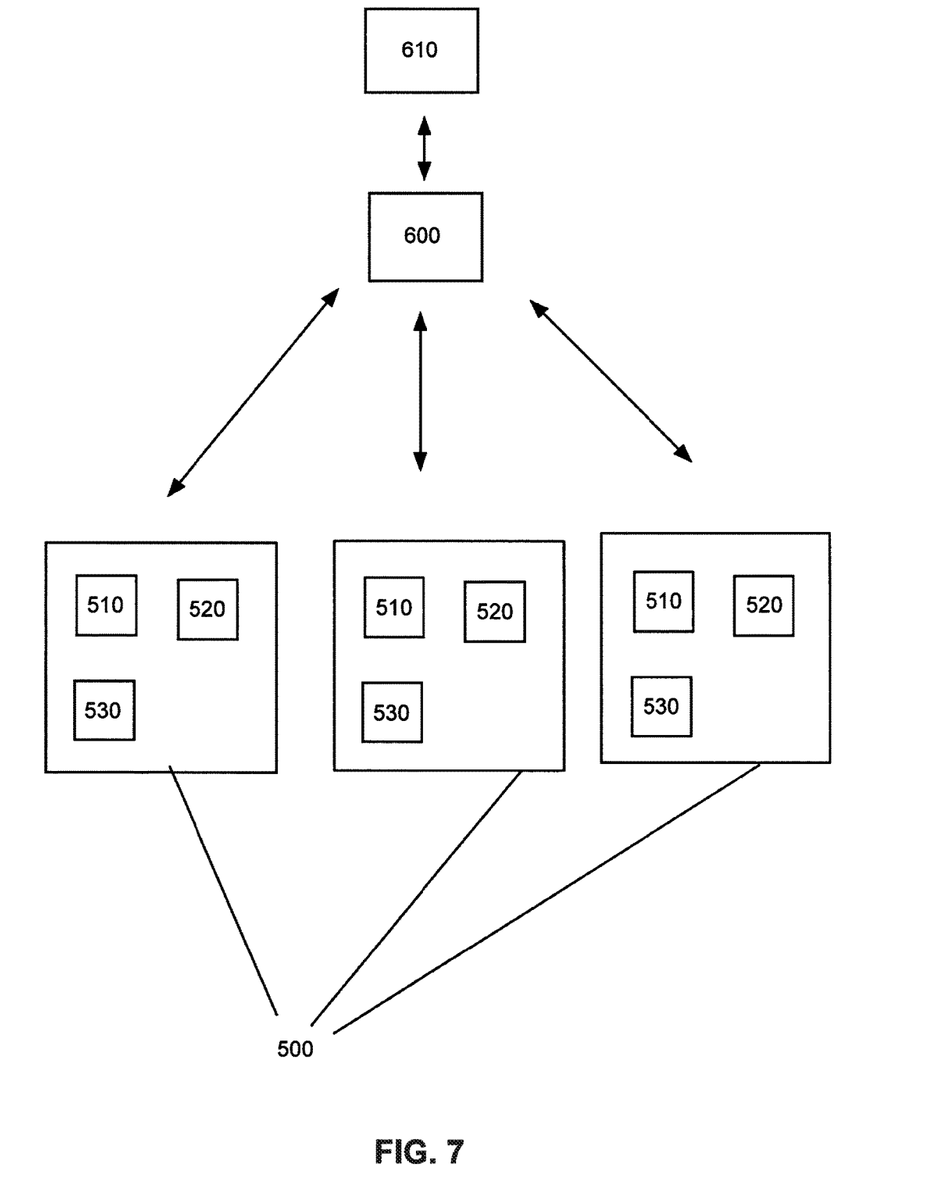
FIG. 7 illustrates a schematic diagram including a plurality of plug outlet devices controlled by a common microcontroller and communication device, according to a fourth example embodiment.

FIG. 7 illustrates a schematic diagram including a plurality of plug outlet devices 500 controlled by a common microcontroller 600 and communication device 610, according to a fourth example embodiment. Multiple locations having one or more plug outlet devices 500 can be controlled and/or monitored using a single microcontroller 600. The plug outlet devices 500 may be situated in arrays so that multiple electric vehicles can be charging simultaneously. Each plug outlet device 500 may include the elements discussed above, such as, for example, an RFID sensor 510, a voltage or current sensor 520, and a contactor 530. In this embodiment, all of the plug outlet devices 500 are operatively coupled to a single common microcontroller 600, which is operatively coupled to a remote server (not shown) through a single common communication device 610. The function of the various components remains substantially the same as described in detail above, and therefore a detailed description will herein be omitted.

Having described and illustrated the principles of the invention with reference to illustrated embodiments, it will be recognized that the illustrated embodiments can be modified in arrangement and detail without departing from such principles, and can be combined in any desired manner.

For example, the embodiments of the invention may provide both monitoring and control of electricity or energy distribution, and with networks that require either long distance or local verification of location and user ID numbers. The contactors discussed above (e.g., 70 and 250) can be modular so that the same type of microcontroller (e.g., 30, 200, and 600) can be used in applications that control current flow (switch on and off) and applications that only monitor energy usage.

By allowing providers such as real estate owners and energy producers to easily bill a large number of electric vehicle users, the system allows not only the users, but also the developers of stations for electric vehicles, the benefit from the gain in efficiency offered by electric vehicles.

Today's costs for electricity is about $0.10/kwh. The cost for energy from renewable sources is higher at about a cost of $0.15 to $0.20/kwh. The embodiments of this invention allow for energy producers to generate energy from renewable sources at the higher cost, and still offer electric vehicle users a significant savings over gasoline. In other words, by facilitating billing transactions between electric vehicle users and electricity producers, the embodiments of the invention can be used to give all parties a convenient, cost effective way to combine the efficiency of electric vehicles and the environmental benefits of renewable generation with an end price that is lower to the driver than more polluting gasoline transportation. The system may automatically check recharging station maintenance from a remote server, which provides the station owner with assurance that the station will remain operational. The billing may also be fully automated thereby eliminating unessential labor costs that would otherwise be a limiting factor to implementing a large scale electricity distribution system for electric vehicles.

Other embodiments may provide for alternate configurations, which carryout similar objectives to the preferred embodiments. These involve attaching the communication components to the vehicle rather than to the plug outlet, a means of conserving components in arrays of multiple plug outlets, and a configuration that combines components into enclosures, which can easily attach to a vehicle or a stationary power source using a wire conductor (e.g., loop) or a plug adaptor. Furthermore, embodiments of the invention may include a method by which modularized components provide flexibility across a variety of communication systems and allow users and real estate owners to choose between either monitoring and/or control capabilities. Other applications of the disclosed embodiments include: security systems, backup power, automated energy management systems, and power generation monitoring and control systems, among other possibilities.

Although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A method, comprising:
storing, in a database, a plurality of different electricity prices corresponding to a plurality of different locations of a plurality of plug outlet devices;
providing an embedded radio frequency identification (RFID) tag in a plug adapter apparatus that is coupled to a vehicle and separate from the plurality of plug outlet devices;

detecting, by a radio frequency identification (RFID) sensor associated with a particular plug outlet device from among the plurality of plug outlet devices, information about the vehicle including a user identification (ID), from the RFID tag embedded in the plug adapter apparatus that is coupled to the vehicle;

receiving the plug adapter apparatus at the particular plug outlet device;

receiving energy, at the particular plug outlet device, from an energy source;

transmitting, by a microcontroller associated with the particular plug outlet device, the user ID, a station ID associated with a station, and a location of the particular plug outlet device, to a remote computer server via an intermediary wireless communication device;

storing a log of a plurality of communications, by the intermediary wireless communication device, between the particular plug outlet device and the remote computer server;

verifying, by the microcontroller associated with the particular plug outlet device, the user ID and the station ID with the remote computer server;

wherein verifying includes receiving, by the microcontroller associated with the particular plug outlet device, a verification signal from the remote computer server;

when the user ID and the station ID are verified based at least on the verification signal, causing, by the particular plug outlet device, energy to be delivered to the vehicle;

monitoring, by the microcontroller associated with the particular plug outlet device, energy usage by taking measurements using at least one of a voltage sensor or a current sensor;

detecting, by the at least one of the voltage sensor or the current sensor when the vehicle finishes receiving the energy;

communicating, by the microcontroller associated with the particular plug outlet device, an amount of energy provided to the vehicle to the remote computer server;

the remote computer server accessing the database and determining a particular price of electricity from among the plurality of different prices stored in the database;

wherein determining the particular price of electricity further includes accessing the plurality of different locations of the plug outlet devices stored in the database and determining, by the remote computer server, the particular price of electricity for a particular location of the particular plug outlet device from among the plurality of different locations of the plug outlet devices;

wherein determining the particular price of electricity further includes accessing the database and determining, by the remote computer server, the particular price of electricity based on whether a source of the energy is a renewable source of energy;

automatically adjusting an account associated with the vehicle and the user ID by an amount associated with the determined particular price of electricity and the amount of energy provided;

storing, in the database, an account associated with the station having the station ID that is configured to provide the energy to the particular plug outlet device to charge the vehicle;

the remote computer server accessing the database and determining a surcharge from the database;

wherein the surcharge is based on the station having the station ID that is configured to provide the energy to the particular plug outlet device to charge the vehicle;

crediting the account associated with the station having the station ID;

wherein crediting the account associated with the station having the station ID further comprises automatically crediting, by the remote computer server, the account associated with the station having the station ID by an amount corresponding to at least a cost of the energy provided to charge the vehicle; and wherein crediting the account associated with the station having the station ID further comprises automatically crediting, by the remote computer server, the account associated with the station having the station ID by the surcharge in addition to the amount corresponding to the cost of the energy provided.

2. The method of claim 1, wherein automatically adjusting the account further comprises:
deducting from the account associated with the vehicle by the amount associated with the determined particular price of electricity.

3. The method of claim 1, further comprising:
storing the account associated with the vehicle in the database.

4. The method of claim 1, wherein communicating the amount of energy provided to the vehicle to the remote computer server further comprises:
wirelessly transmitting a message to the remote computer server indicating that the vehicle is finished receiving the energy.

5. The method of claim 4, wherein automatically adjusting the account associated with the vehicle further comprises:
automatically adjusting the account associated with the vehicle responsive to the message.

6. The method of claim 1, wherein automatically adjusting the account associated with the vehicle and the account associated with the station is performed without the use of a credit card.

7. The method of claim 1, wherein receiving the plug adapter apparatus further comprises:
electrically receiving the plug adapter apparatus at the particular plug outlet device.

8. A method, comprising:
storing, in a database, a plurality of different prices of electricity based at least on a plurality of different locations of a plurality of plug outlet devices;

detecting, by a radio frequency identification (RFID) sensor included in a monitoring and communication device in a vehicle, information about a particular plug outlet device including a station identification (ID) of a station, from an RFID tag associated with the particular plug outlet device;

receiving energy, at the particular plug outlet device, from an energy source;

transmitting, by the monitoring and communication device in the vehicle, the station ID, a user ID, and a microcontroller ID associated with a microcontroller of the monitoring and communication device, to a remote computer server;

preventing tampering, by the microcontroller, of the monitoring and communication device;

verifying, by the remote computer server, that the station ID is associated with a valid plug-in location;

verifying, by the remote computer server, that the user ID and the microcontroller ID are associated with a valid user account;

wherein verifying includes receiving, by the microcontroller of the monitoring and communication device, a verification signal from the remote computer server;

when the user ID and the microcontroller ID are verified based at least on the verification signal, causing energy to be delivered to the vehicle;

monitoring, by the microcontroller of the monitoring and communication device, energy usage by taking measurements using at least one of a voltage sensor or a current sensor;

detecting, by the at least one of the voltage sensor or the current sensor when the vehicle finishes receiving the energy;

communicating, by the microcontroller of the monitoring and communication device, an amount of energy provided to the vehicle to the remote computer server;

the remote computer server accessing the database and determining a particular price of electricity from among the plurality of different prices stored in the database;

wherein determining the particular price of electricity further includes accessing the plurality of different locations of the plug outlet devices stored in the database and determining, by the remote computer server, the particular price of electricity for a particular location of the particular plug outlet device from among the plurality of different locations of the plug outlet devices;

wherein determining the particular price of electricity further includes accessing the database and determining, by the remote computer server, the particular price of electricity based on whether a source of the energy is a renewable source of energy;

automatically adjusting an account associated with the user ID and the microcontroller ID by an amount associated with the determined particular price of electricity and the amount of energy provided;

storing, in the database, an account associated with the station having the station ID that is configured to provide the energy to the particular plug outlet device to charge the vehicle;

the remote computer server accessing the database and determining a surcharge from the database;

wherein the surcharge is based on the station having the station ID that is configured to provide the energy to the particular plug outlet device to charge the vehicle;

crediting the account associated with the station having the station ID;

wherein crediting the account associated with the station having the station ID further comprises automatically crediting, by the remote computer server, the account associated with the station having the station ID by an amount corresponding to at least a cost of the energy provided to charge the vehicle; and wherein crediting the account associated with the station having the station ID further comprises automatically crediting, by the remote computer server, the account associated with the station having the station ID by the surcharge in addition to the amount corresponding to the cost of the energy provided.

* * * * *